United States Patent [19]
Davis et al.

[11] Patent Number: 5,625,775
[45] Date of Patent: Apr. 29, 1997

[54] MODEM COMMUNICATION INTERFACE IN A DATA PROCESSING SYSTEM

[75] Inventors: Robert A. Davis, Boca Raton; Steven A. Keller, Coral Springs, both of Fla.

[73] Assignee: International Business Machines Corporation, Armonk, N.Y.

[21] Appl. No.: 259,208

[22] Filed: Jun. 13, 1994

[51] Int. Cl.$^6$ .............................. G06F 13/14; G06F 13/38
[52] U.S. Cl. ................................ 395/200.12; 395/200.07; 395/894
[58] Field of Search ......................... 395/200.12, 200.08, 395/200.07, 894; 364/DIG. 1

[56] References Cited

U.S. PATENT DOCUMENTS

| | | |
|---|---|---|
| 4,363,093 | 12/1982 | Davis et al. . |
| 4,625,081 | 11/1986 | Lotito et al. . |
| 4,646,320 | 2/1987 | Krishman . |
| 4,718,082 | 1/1988 | Parker et al. . |
| 4,755,932 | 7/1988 | Diedrich . |
| 4,803,720 | 2/1989 | Newell et al. . |
| 4,982,325 | 1/1991 | Tignor et al. . |
| 4,987,590 | 1/1991 | Katz . |
| 5,091,933 | 2/1992 | Katz . |
| 5,161,169 | 11/1992 | Galano et al. . |
| 5,165,020 | 11/1992 | Sudama et al. ............... 395/200.12 |
| 5,185,742 | 2/1993 | Bales et al. . |
| 5,185,787 | 2/1993 | Katz . |
| 5,187,787 | 2/1993 | Skeen et al. . |
| 5,193,110 | 3/1993 | Jones et al. . |
| 5,235,638 | 8/1993 | Dondero . |
| 5,243,643 | 9/1993 | Sattar et al. . |
| 5,301,280 | 4/1994 | Schwartz et al. ............... 395/200.12 |
| 5,307,347 | 4/1994 | Duault et al. . |
| 5,475,817 | 12/1995 | Waldo et al. ............... 395/200.12 |

FOREIGN PATENT DOCUMENTS

| | | |
|---|---|---|
| 1059440 | 7/1979 | Canada . |
| 0464352 | 1/1992 | European Pat. Off. . |
| 63-224543 | 9/1988 | Japan . |

OTHER PUBLICATIONS

J. Aiken, et al, "High Availability System For Use With The SS7 Network and The Intelligent Network", IBM Technical Disclosure Bulletin, vol. 34, No. 9, Feb. 1992, pp. 80–82.

M.D. Smith, et al, "Home Terminal Access to Lan Servers Utilizing Host Connection", IBM Technical Disclosure Bulletin, vol. 34, No. 8, Jan. 1992, pp. 382–383.

G.T. Davis, et al, "Microcode Architecture For Implementing Multiple Modems Using a Single Digital Processor", IBM Technical Disclosure Bulletin, vol. 30, No. 11, Apr. 1988, pp. 400–402.

L.P. West, "Signal Processing Subsystem", IBM Technical Disclosure Bulletin, vol. 29, No. 4, Sep. 1986, pp. 1732–1734.

E. Covey, et al, "Enhancement of Ehllapi to Support Multiple Concurrent Structured Field Connections to the Same 3270 Emulations Session", IBM Technical Disclosure Bulletin, vol. 36, No. 1, January 1993, p. 44.

*Primary Examiner*—Larry D. Donaghue
*Assistant Examiner*—Mark H. Rinehart
*Attorney, Agent, or Firm*—Richard A. Tomlin; Andrew J. Dillon

[57] ABSTRACT

The present invention includes an apparatus for providing communications between two data processing systems. The present invention includes a first data processing system, a second data processing system, and a communications line connecting the first and second data processing systems. Also included is a first interface located on the first data processing system and a second interface located on the second data processing system, wherein the first interface includes means for establishing a connection between the first and second interfaces, means for establishing a session for each application on the first data processing system requiring communication with an application on the second data processing system and wherein the first and second interfaces includes means for controlling communication between the applications having an established session.

29 Claims, 17 Drawing Sheets

```
typedef struct_COMMCFG
{
    HCHAN  Channel;                    /* used for internal processing */
    ULONG  InactivityTimeout;          /* Timeout before hang-up        */
    USHORT Baud;                       /* baud rate                     */
    BOOL   DirectConnect;              /* Flag: direct connect / Modem  */
    UCHAR  Number[NUMBER_SIZE];        /* Phone number to be dialed     */
    UCHAR  Port;                       /* COM port number (1-8)         */
    UCHAR  Databits;                   /* Number of data bits (5,6,7,8) */
    UCHAR  Stopbits;                   /* Stop bits (0,1,2)             */
    UCHAR  Parity;                     /* Parity                        */
    UCHAR  NodeName[NODE_SIZE];        /* Name to identify machine by   */
}COMMCFG, *PCOMMCFG;
```

```
typedef struct_MNCB                    /* Modem Network Control Block */
{
    ULONG Status;                      /* Status of the session         */
    HEV   EventSem;                    /* Handle to an event semaphore  */
    UCHAR LocalSessionNumber;          /* # representing local session  */
    CHAR  Name[NAME_SIZE];             /* Name to known by              */
}NMCB, *PMNCB;
```

```
/*
** Structure used by Modem Network APIs when sending data over the COM port
*/
typedef struct_MN_HEADER
  {
    ULONG TransactionNumber;      /*Transaction number               */
    ULONG Status;                 /*status of data being xfer        */
    ULONG DataSize;               /*size of data being xfer          */
    UCHAR Command;                /*command in process               */
    UCHAR SenderSessionNumber;    /*Session number of data sender    */
    UCHAR ReceiverSessionNumber;  /*Session num of data receiver     */
  }MN_HEADER,*PMN_HEADER;
```

```
/*
** Structure used by Modem Network APIs to queue transactions
*/
typedef struct_MN_TRANSACT
  {
    PMNCB      pMNCB;        /*Pointer to Modem Network CB   */
    PUCHAR     Data;         /*Pointer to the data           */
    MN_HEADER  MNHeader;     /*A transaction header          */
    UCHAR      Action;       /*Action to be performed        */
  }MN_TRANSACT, *PMN_TRANSACT;
```

```
/*
** Structure used for Active Sessions
*/
typedef struct_MN_SESSION
  {
    UCHAR LocalSession Number;
    UCHAR RemoteSession Number;
  }MN_SESSION,*PMN_SESSION;
```

MODEM COMMUNICATION INTERFACE IN A DATA PROCESSING SYSTEM

BACKGROUND OF THE INVENTION

1. Technical Field

The present invention relates in general to a method and system for providing data exchange between data processing systems and in particular to a method and system for providing modem communications between data processing systems. Still more particularly, the present invention relates to a method and system for providing modem communications between multiple applications in different data processing systems.

2. Description of the Related Art

A modem is a device utilized to transmit data between data processing systems such as, computers, workstations, and other peripheral devices interconnected by means of conventional communications lines supporting analog transmissions. Modems transform (modulate) digital data from a digital device, such as a computer, to an analog form suitable for transmission over conventional communications lines. A modem also receives an analog signal and restores (demodulates) the analog signal back to its original form. Modems come in a number of different forms and types. Different modems have different transmissions speeds and they may be externally or internally connected to a data processing system. Modems may include a number of features such as auto-dial, automatic speed detection of the modem being called, and automatic switching to the speed of the modem being called, error detection and correction, data compression, and multiple modulation techniques.

With the introduction of OS/2, concurrent execution of multiple programs has been a focus of program developers. "OS/2" is a trademark of International Business Machines Corporation, located in Armonk, N.Y. Such applications in a data processing system may gather data from other data processing systems within a network. Sometimes a user utilizing a data processing system having multiple applications executing concurrently at a site may desire to obtain data from another data processing system having multiple applications executing concurrently at a second site using a modem.

In such a situation, it would be advantageous to have a method and system for providing communication of data between multiple applications concurrently executing on different data processing systems.

SUMMARY OF THE INVENTION

It is therefore one object of the present invention to provide a method and system for providing data exchange between data processing systems.

It is another object of the present invention to provide a method and system for providing a modem communications between data processing systems.

It is yet another object of the present invention to provide a method and system for providing a modem communications between multiple applications in different data processing systems.

The foregoing objects are achieved as is now described. The present invention includes an apparatus for providing communications between two data processing systems. The present invention includes a first data processing system, a second data processing system, and a communications line connecting the first and second data processing systems. Also included is a first interface located on the first data processing system and a second interface located on the second data processing system, wherein the first interface includes means for establishing a connection between the first and second interfaces, means for establishing a session for each application on the first data processing system requiring communication with an application on the second data processing system and wherein the first and second interfaces includes means for controlling communication between the applications having an established session.

In a preferred embodiment, if the connection is terminated, the sessions are not terminated. Instead, the connection is reestablished automatically or in response to some event. The connection may be purposefully terminated to said connection time or to connect to other data processing systems while maintaining the established sessions.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts a communication structure in accordance with a preferred embodiment of the present invention;

FIG. 6 depicts a modem network control block data structure;

FIG. 7 depicts a data structure that is a header;

FIG. 8 depicts a transaction structure used to queue transaction;

FIG. 9 is a data structure employed to tract active sessions; and

DETAILED DESCRIPTION OF PREFERRED EMBODIMENT

Figure 1:
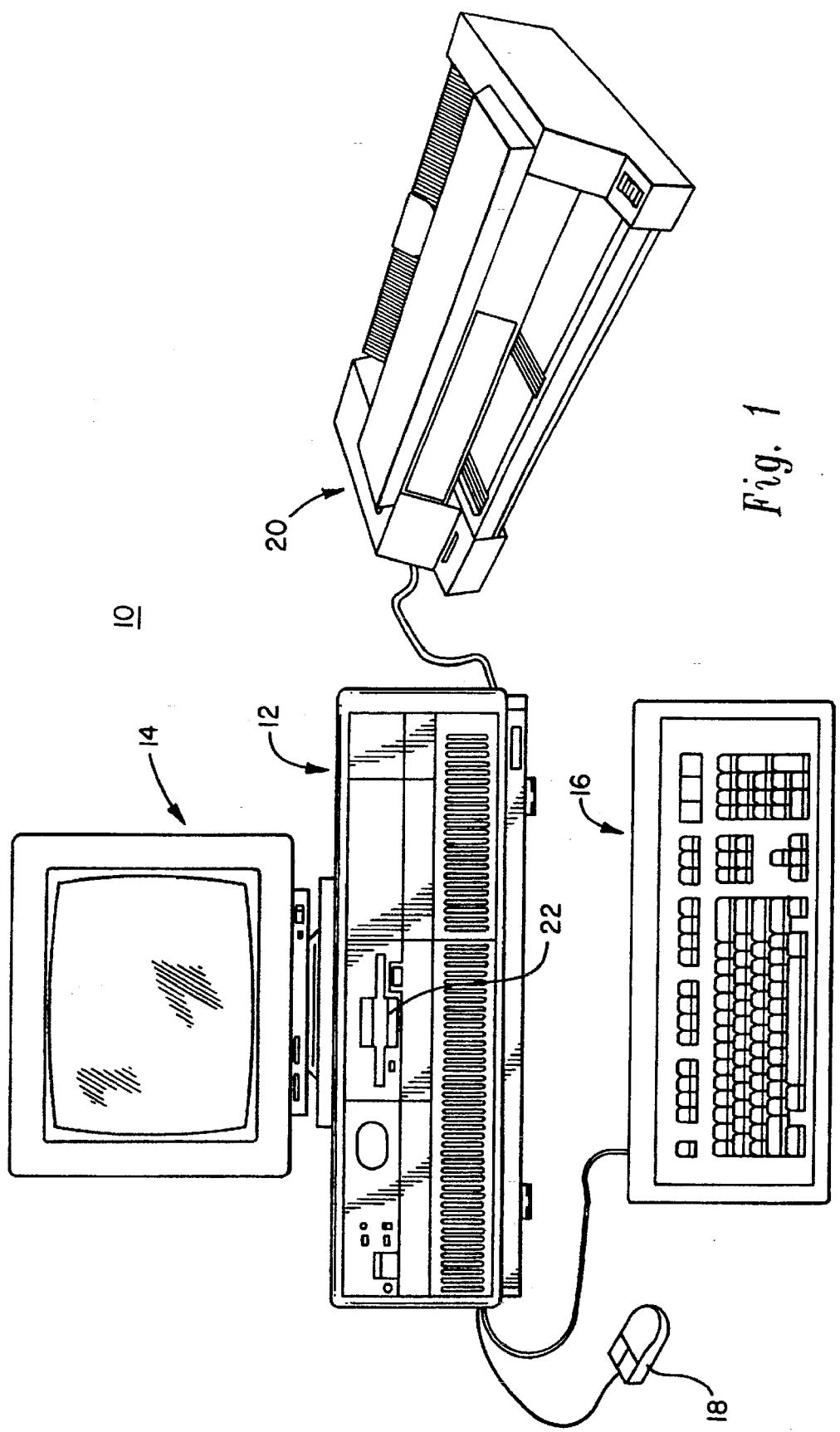
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
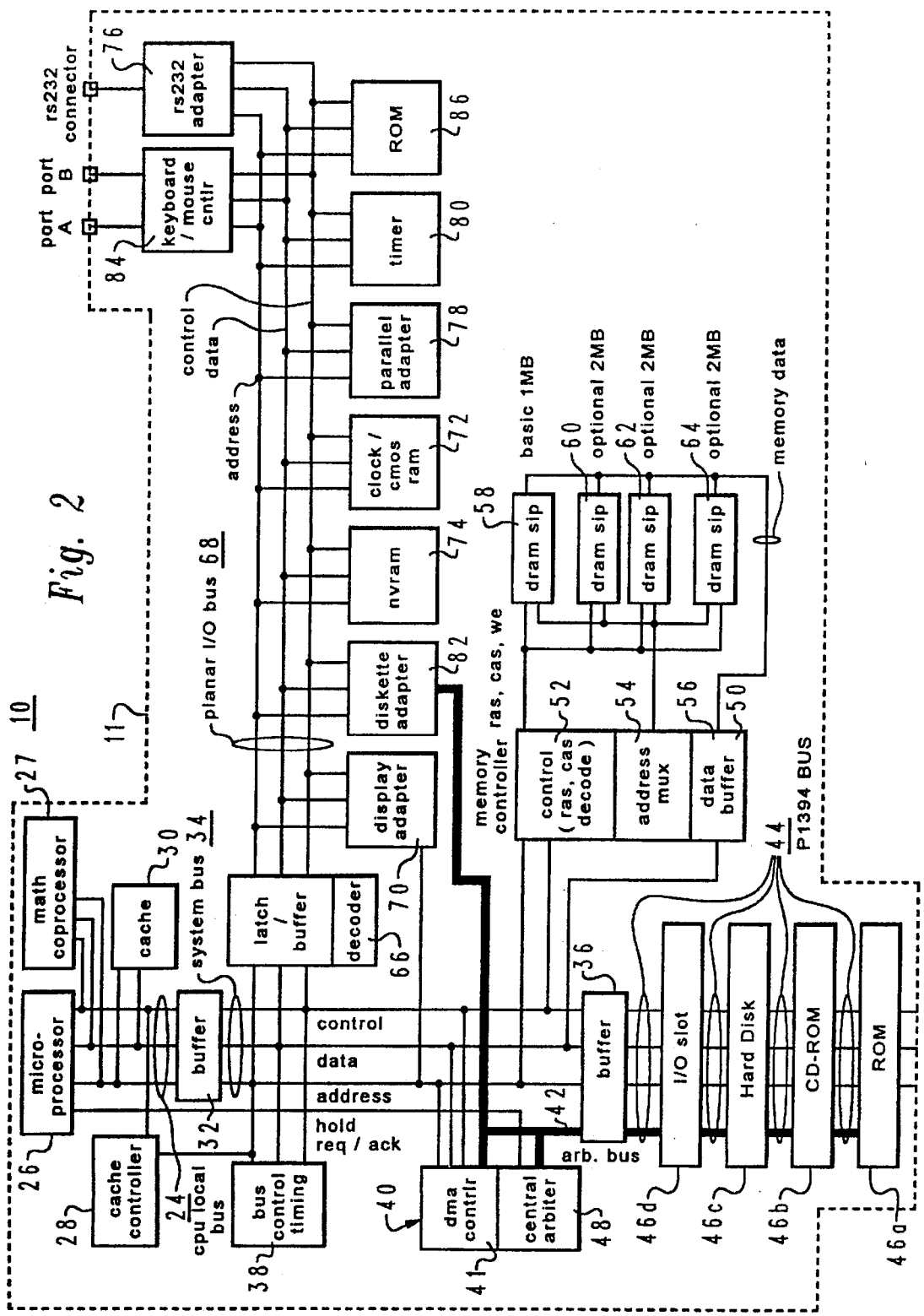
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. A modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

In accordance with a preferred embodiment of the present invention, OS/2 is the operating system in which the modem interface is implemented. Those skilled in the art will realize that the present invention may be implemented in other multi-tasking operating systems. OS/2 provides the capability to execute programs concurrently in a protected environment. This operating system defines the model employed for sharing system resources in a data processing system. The model includes a hierarchy of multi-tasking objects called sessions, processes, and threads. A session is the unit of user I/O device sharing. Processes are the unit of sharing for resources such as memory, files, semaphores, cues, and threads. A process is analogous to a program. A thread is the basic unit of execution. A single process may include multiple threads that execute concurrently within it. A semaphore is an entity employed to control access to system resources. Processes may be locked to a resource with semaphores if the processes follow specified programming conventions. More information on OS/2 may be found in a text entitled The Design of OS/2 by Deitel and Kogan, published by Addison-Wesley Publishing Company 1992.

With reference now to FIG. 3, a block diagram of software components employed to transmit data between multiple applications over a communications line, such as a phone line, is depicted in accordance with a preferred embodiment of the present invention. Data processing system 300 includes applications A and E and interface 302. Data processing system 304 contains applications B, C, D and interface 306. Data processing system 300 and 304 are connected to each other via modems 301 and 303 and communications line 308. A communications line may be for example, a serial cable connecting the data processing systems or a switched network, such as a switched telecommunications network. In a switched telecommunications network, data may be transmitted across this network in various forms. Data may, for example, begin as an analog signal and at some point be converted to a digital signal for further transmission. A switched telecommunications network also may include wireless communication links or microwave links to transmit data across the switch network. Typically, for application A to receive or send data to applications B–D, application A must initiate a session with one of the applications and complete all data exchanged with the application before beginning data exchange with another application in data processing system 304. Under the present invention, multiple sessions may be present at the same time. For example, in addition to application A having a session with application D, application E could communicate with application C in another session over the same communication line.

The present invention provides a capability for application A to communicate with applications B, C, and D at the same time. Application A would call each of the applications using synchronous call function, such as MNCall. This particular function is described in more detail below. After all of the applications have been called and a session has been established, data may be sent between application A and applications B, C, and D in a fashion similar to "time slicing", which is a technique employed to share resources in a multi-tasking environment. At some point, application A may terminate communications with one or more of the applications in data processing system 304. In addition, E can communicate with D at the same time.

Figure 3A:
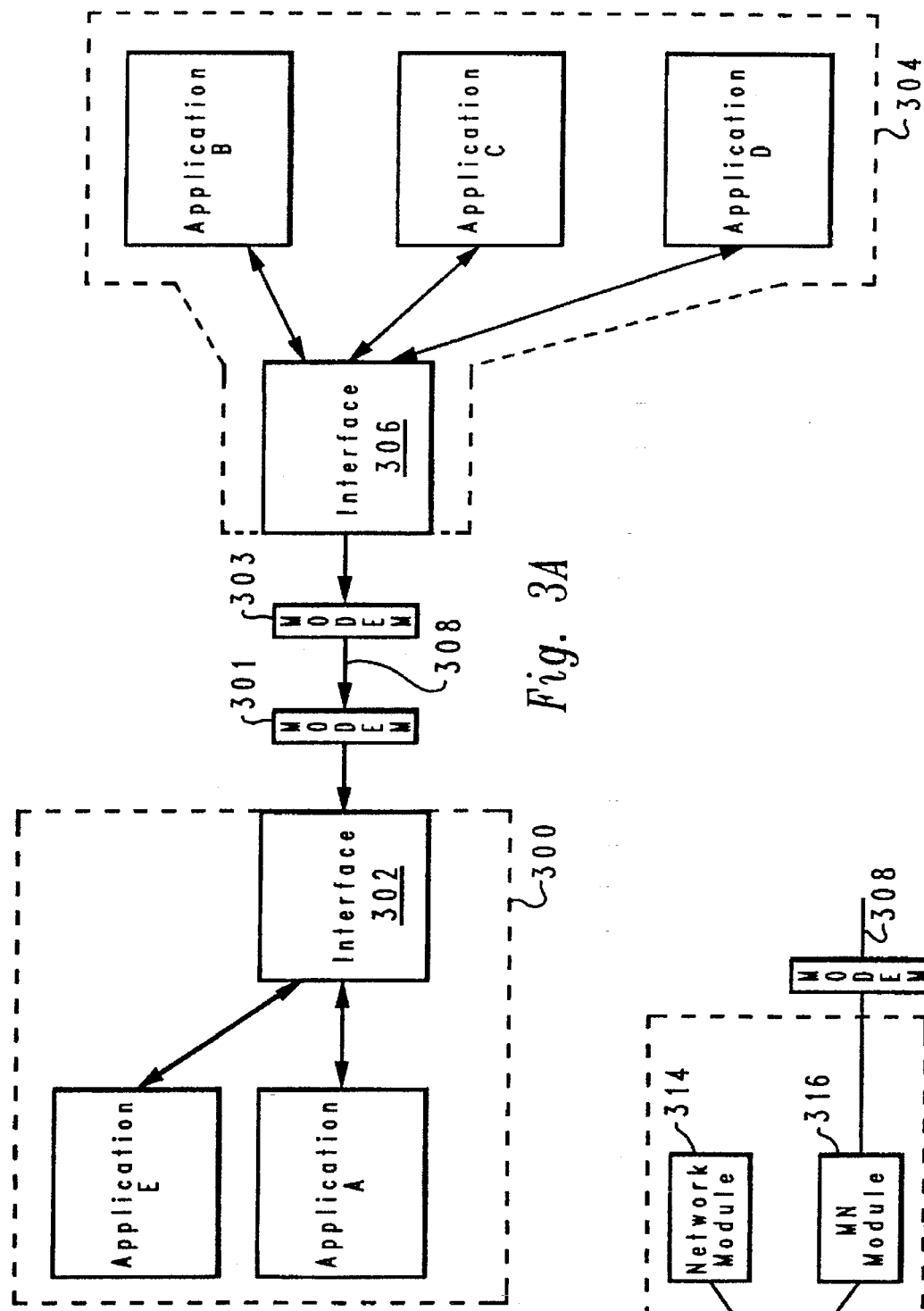
FIG. 3 depicts a block diagram of software components employed to transmit data between multiple applications over a communications line in accordance with a preferred embodiment of the present invention.
Figure 4:
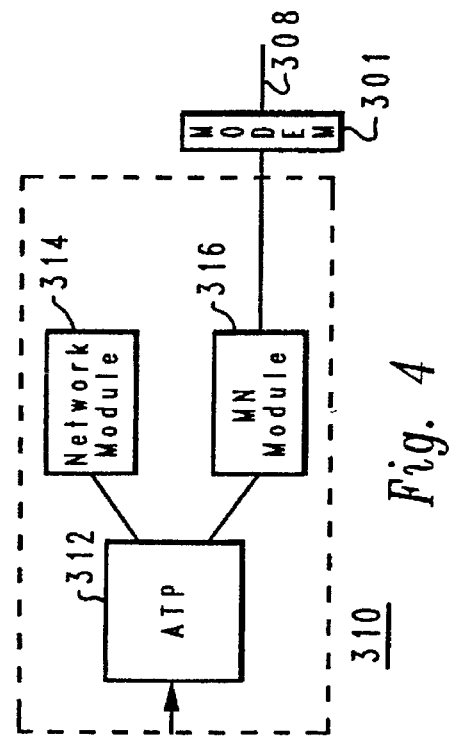
FIG. 4 is a block diagram of an interface depicted in FIG. 3.

Referring now to FIG. 4, a block diagram of an interface, such as interface 302 or 306 in FIG. 3A, is depicted in accordance with a preferred embodiment of the present invention. Interface 302 includes Adaptive Tool Platform (ATP) 312 which is available from International Business Machines Corporation. ATP 312 receives commands and request for data from an application, such as application A in FIG. 3. ATP 312 employs network module 314 or MN module 316 to transfer data to another data processing system. Network module 314 is employed when the data processing system is connected to a network. The MN modem network module is employed to communicate with another data processing system that is not connected to a network. As can be seen, MN module sends data over communications line 308.

The present invention allows the use of multiple sessions. A "session" is a logical link between applications across a physical link, such as a communications line, such as communications line 308. Communications in these sessions are handled by transferring blocks of data with headers across the communications line. The usage of sessions is similar to that in a computer network system. In accordance with a preferred embodiment of the present invention, the sessions established by the interfaces are not terminated if the physical communications provided by a communications line is lost or disconnected. For example, if one data processing system hangs up the communications line, the session between the applications in the data processing systems are not terminated. Instead, when an application desires to send data to another application in the session, the present invention provides for the connection or link across the communications line to be reestablished, and then sends the data to the other application.

Furthermore, a time-out may be set, such that after a selected amount of inactivity, the data processing will disconnect itself from the communications line. As before, when an application desires to send data to another application sharing the session, the present invention reestablishes a connection across the communications line and then send the data. All this occurs without terminating the logical session in progress. This feature provides a user a method to reduce toll charges over a long distance communications line without having to reestablish a session each time data is to be sent from an application from one data processing system to another application on another data processing system.

Reestablishing the connection may be preset by a configuration file so that one data processing system will always attempt to reestablish the connection, or information could be exchanged such that either data processing system could reestablish the connection.

Referring now to FIG. 5, a communications configuration data structure is depicted in accordance with a preferred embodiment of the present invention. Data structure 500, also called COMMCFG, contains parameters associated with a COM port, such as the baud rate, parity, etc. In FIG. 6, data structure 600 is the modem network control block. This data structure is employed by the present invention to store information for a session. In FIG. 7, data structure 700 is a header that is employed by modem network API's when sending data over the COM port. Data structure 800 in FIG. 8 is a transaction structure, MN_TRANSACT, that is used by the modem networks API's to queue transactions. Data structure 900 in FIG. 9 is used to track active sessions. These data structures in FIGS. 5–9 are in C language form and employed by various procedures in the figures below to enable the use of multiple sessions of communications line.

The following flowcharts illustrate functions employed to support multi-session data exchange between multiple sessions over a single standard analog communications line, such as a phone line.

Figure 10:
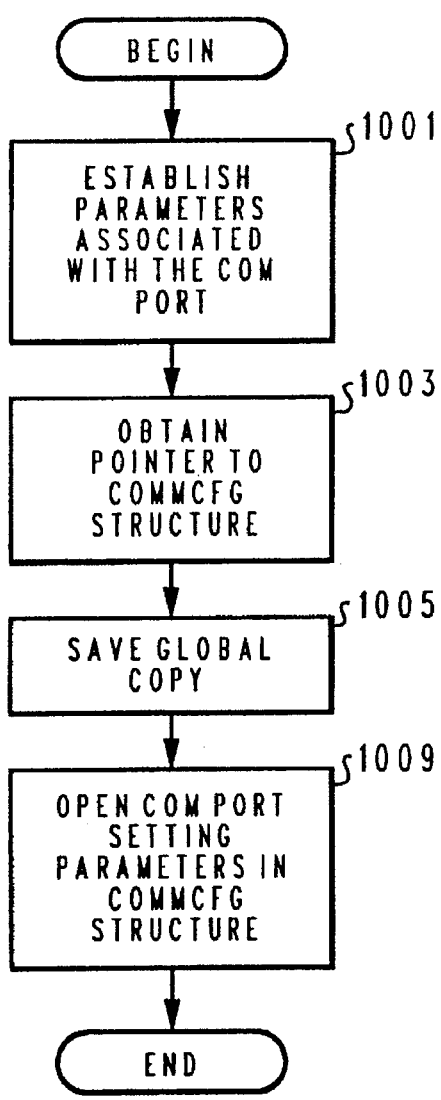
FIGS. 10–21 are flowcharts of the processes employed to provide multiple sessions over a communications line in accordance with a preferred embodiment of the present invention.

AsyncOpenPort is a function employed to establish parameters associated with the COM port, for example baud rate, parity, etc. this function requires a pointer to the COMMCFG structure. The function takes the information found in this structure and saves a global copy for later use. The function also opens the COM port setting the parameters found in the COMMCFG structure. In addition, this function returns errors to the caller. Referring to FIG. 10, a flowchart of the process followed by an AsyncOpenPort is illustrated in accordance with preferred embodiment of the present invention. The function establishes parameter associated with the COM port, as illustrated in block 1001. Thereafter, the function obtains a pointer to the COMMCFG structure, as depicted in block 1003. The function saves a global copy of the information, as illustrated in block 1005. The function then opens the COM port setting the parameters as found in the COMMCFG structure as depicted in block 1009.

Figure 11:
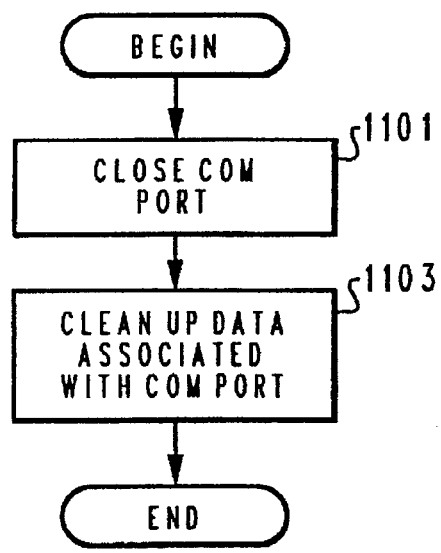

AsyncClosePort is a function employed to close the COM port and clean up any data associated with the given port. No parameters are associated with this function. Referring to FIG. 11, a flowchart of the process followed by the AsyncClosePort function is illustrated in accordance with a preferred embodiment of the present invention. The function closes the COM port, as illustrated in block 1101. Thereafter, the data associated with the COM port is cleaned up, as depicted in block 1103. Cleaning up data involves freeing up memory and buffers used to store data associated with the COM port.

AsyncCall is a function utilized to send commands to the modem. These commands sent to the modem are those required for dialing the number defined in the COMMCFG structure. The AsyncCall function contains no input parameters. Instead, information from the global communications data structure is used.

Figure 12:
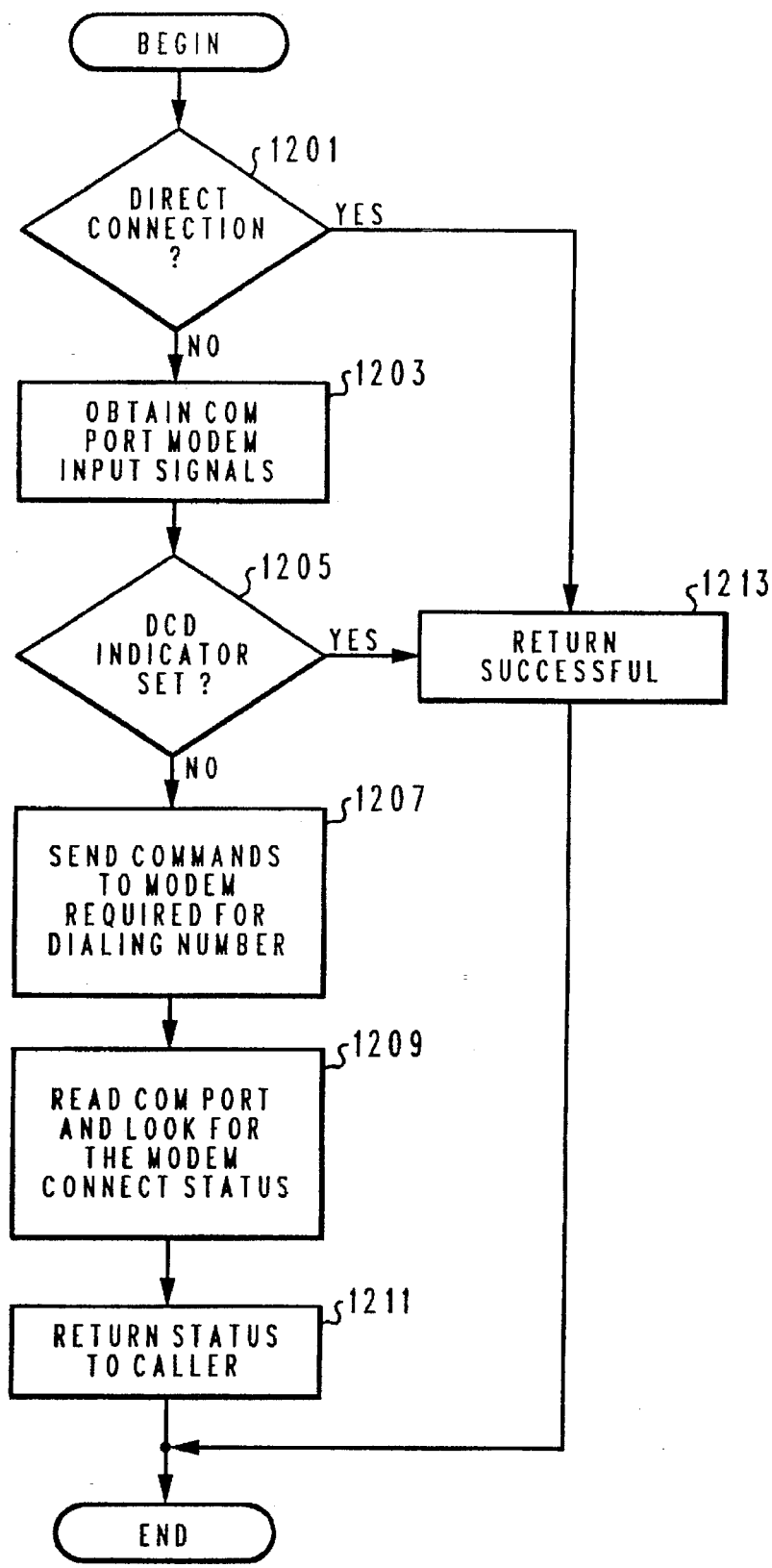

Referring now to FIG. 12, a flowchart of the process employed by the AsyncCall function is illustrated in accordance with a preferred embodiment of the present invention. The function determines whether the connection is a direct connection, as illustrated in block 1201. If a direct connection is absent, the function obtains the COM port modem input signals, as depicted in block 1203.

Thereafter, the function determines whether the data carrier detect (DCD) indicator is set, as illustrated in block 1205. The setting of the DCD indicator indicates that the modem is connected. If the answer to this determination is no, the function then send commands to the modem required for dialing the number, as depicted in block 1207. Next, the function reads the COM port and looks for the modem connect status, as illustrated in block 1209. The function ends after the status is returned to the caller, as depicted in block 1211.

Referring again to block 1201, if a direct connection is present, the function returns an indication that the call is successful, as illustrated in block 1213. Referring again to block 1205, if the DCD indicator is set, the function also returns an indication that the call was successful, as illustrated in block 1213.

Figure 13:
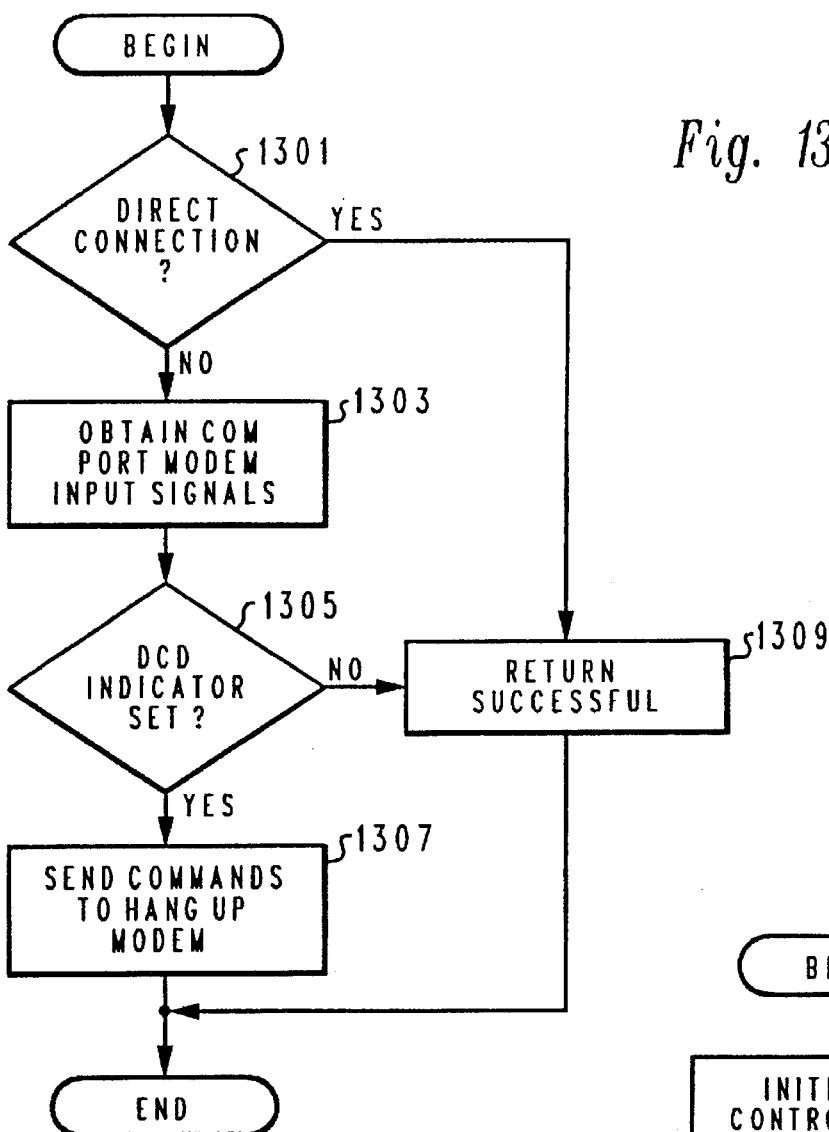

The AsyncHangup function is employed to cause the modem to hang-up the call. This particular function has no parameters. Information is obtained from the global communications configuration structure stored in memory. Referring now to FIG. 13, a high level flowchart of the process employed by the AsyncHangup function is illustrated in accordance with a preferred embodiment of the present invention. The function begins by determining whether a direct connection exist, as illustrated in block 1301. If a direct connection is absent, the function then obtains the COM port modem input signals, as depicted in block 1303. Thereafter, the function determines whether DCD indicator is set, as illustrated in block 1305. If the DCD indicator is not set, the function sends commands to hang-up the modem, as depicted in block 1307.

Referring again to block 1301, if the connection is a direct connection, the process returns an indication that the hang-up was successful, as illustrated in block 1309. Referring back to block 1305, If the DCD indicator is not set, the process returns an indication that the hang-up was successful, as illustrated in block 1309.

Figure 14:
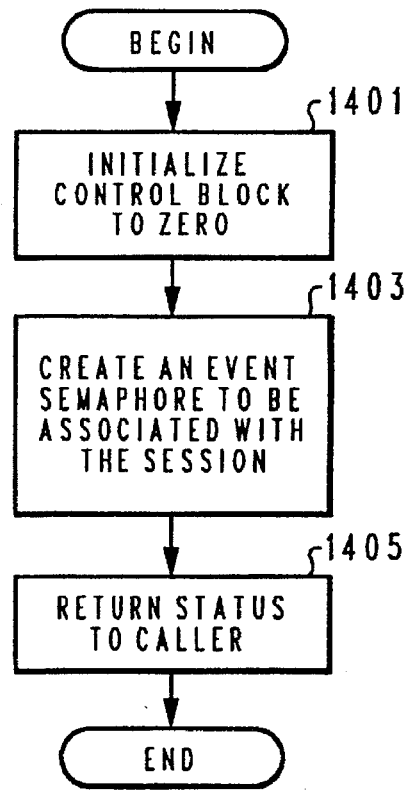

The open function, MNOPEN (PMNCD pMNCD), clears out the modem network control block (MNCB) and creates an event semaphore. An "event semaphore" is employed as a shared variable to synchronize concurrent processes by indicating whether an action had been completed or an event has occurred. Referring to FIG. 14, a flowchart of a process employed by an open function is illustrated in accordance with a preferred embodiment of the present invention. The open function initializes the control block to zero, as illustrated in block 1401. The function then creates an event semaphore to be associated with the session, as depicted in block 1403. The function ends after the status is returned to the caller, as illustrated in block 1405.

Figure 15:
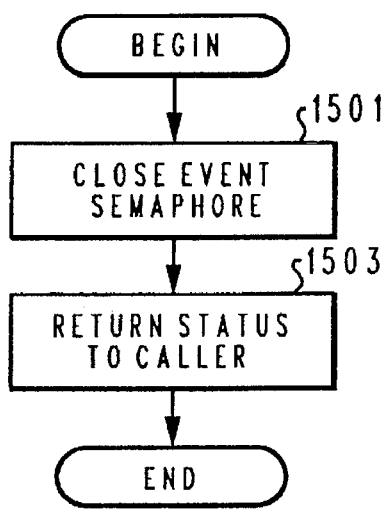

The close function, MNCLOSE (PMNCB pMNCB), will close the event semaphore. PMNCB is the structure type and PMNCB is the name for the type. With reference to FIG. 15, a flowchart of the process employed by the close function is illustrated in accordance with a preferred embodiment of the present invention. The function begins by closing the event semaphore, as illustrated in block 1501. Thereafter, the process terminates by returning the status to the caller, as depicted in block 1503.

A listen API, MNListen (PMNCB pMNCB), suspends the caller until a call is received, the command is canceled by another thread, or if a serious error is detected. When using the listen API, the listener's name must be specified in the name field of the MNCB pointed to by the pMNCB parameter.

Figure 16:
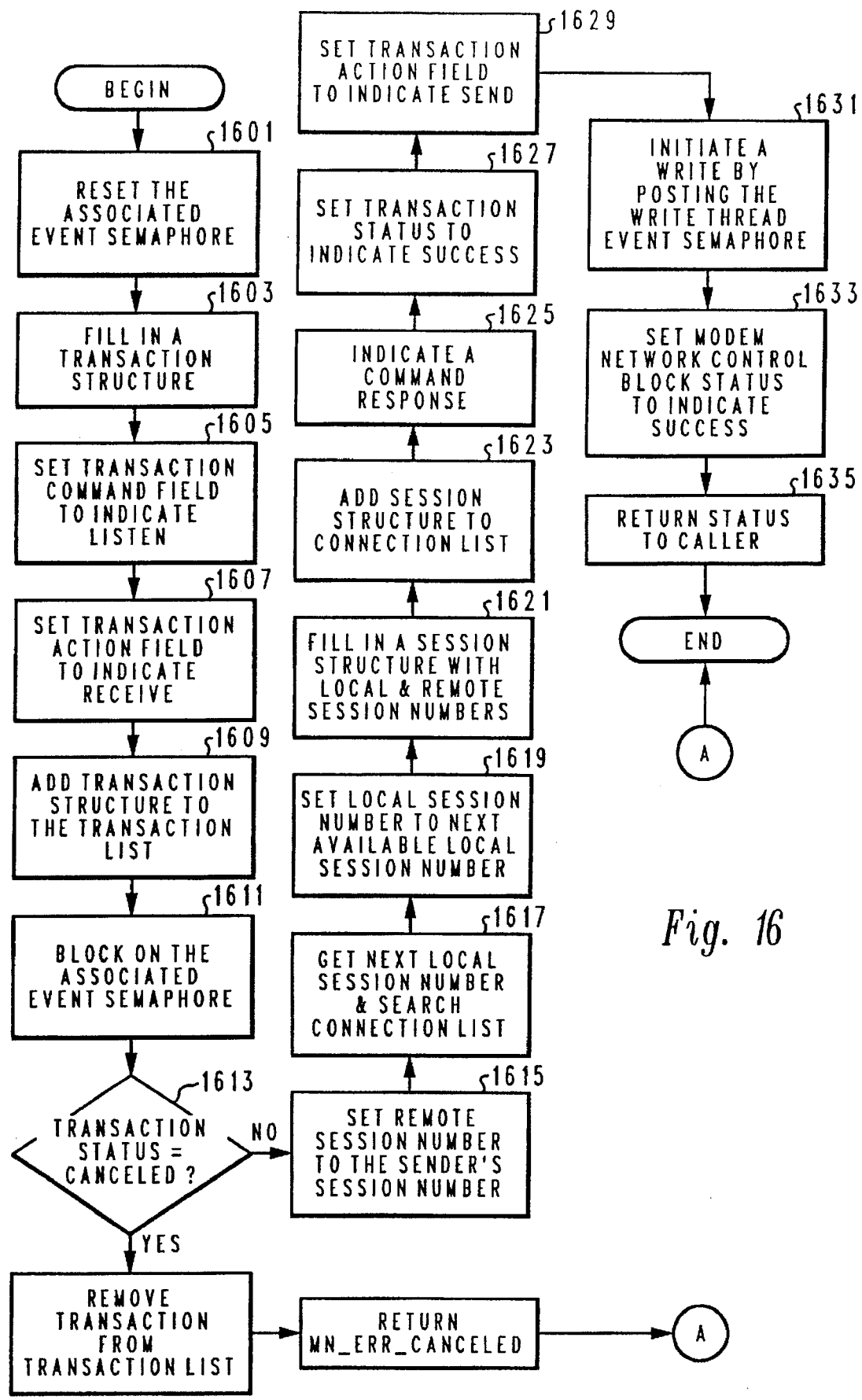

Referring now to FIG. 16, a flowchart of the process employed by the listen API is illustrated in accordance with the preferred embodiment of the present invention. The process begins by resetting the associated event semaphore, as illustrated in block 1601. The process fills in a transaction structure, MN_TRANSACT, as illustrated in block 1603. Next, the process sets the transaction Command field to indicate listen as illustrated in block 1605. The process then sets the transaction Action field to indicate receive as depicted in block 1609. The transaction structure is added to the transaction list, as illustrated in block 1609.

Thereafter, the process blocks on the associated event semaphore, as depicted in block 1611. Blocking on an associated event semaphore means that the transaction associated with the event semaphore will wait for an event to occur, wherein the event will be indicated by the event semaphore. Basically, the transaction waits for the event semaphore to be "cleared". The process then determines whether the transaction status equals canceled, as illustrated in block 1613. If the transaction status does not equal canceled, the process then sets the remote session number to the sender's session number, as depicted in block 1615. The process then obtains the next local session number and searches the connection list to make sure that the local session number is not being utilized, as illustrated in block 1617. The process sets the local session number to the next available session number found, as depicted in block 1619.

Next, session structure is then filled with the local and remote session numbers, as illustrated in block 1621. The process adds the session structure to a connection list, as depicted in block 1623. The connection list is a list of connections as indicated by the session structures in the list. Next, the process indicates a command response, as illustrated in block 1625. The transaction status is set by the process to indicate success, as depicted in block 1627. Thereafter, the process sets the transaction Action field to indicate send, as illustrated in block 1629. Then, a write is initiated by the process posting the write thread event semaphore, as depicted in block 1631. Posting a semaphore is done to indicate an event has occurred to initiate an action, such as a write operation by the thread associated with the event semaphore. The process then sets the modem network control block status to indicate success, as illustrated in block 1633. The process finishes by returning the status to the callers as depicted in block 1635.

Referring again to block 1613, if the transaction status is equal to canceled, the process then removes the transaction from the transaction list, as illustrated in block 1637. The process then terminates by returning an indication that an error has occurred and the API command has been canceled, as depicted in block 1639.

The call API, MNCall (PMNCB pMNCB, PUCHARCalledName), is employed to establish a session with the name specified by the CalledName parameter. This call API command will call the AsyncCall API to establish a connection and then send the request out through the COM line.

Figure 17A:
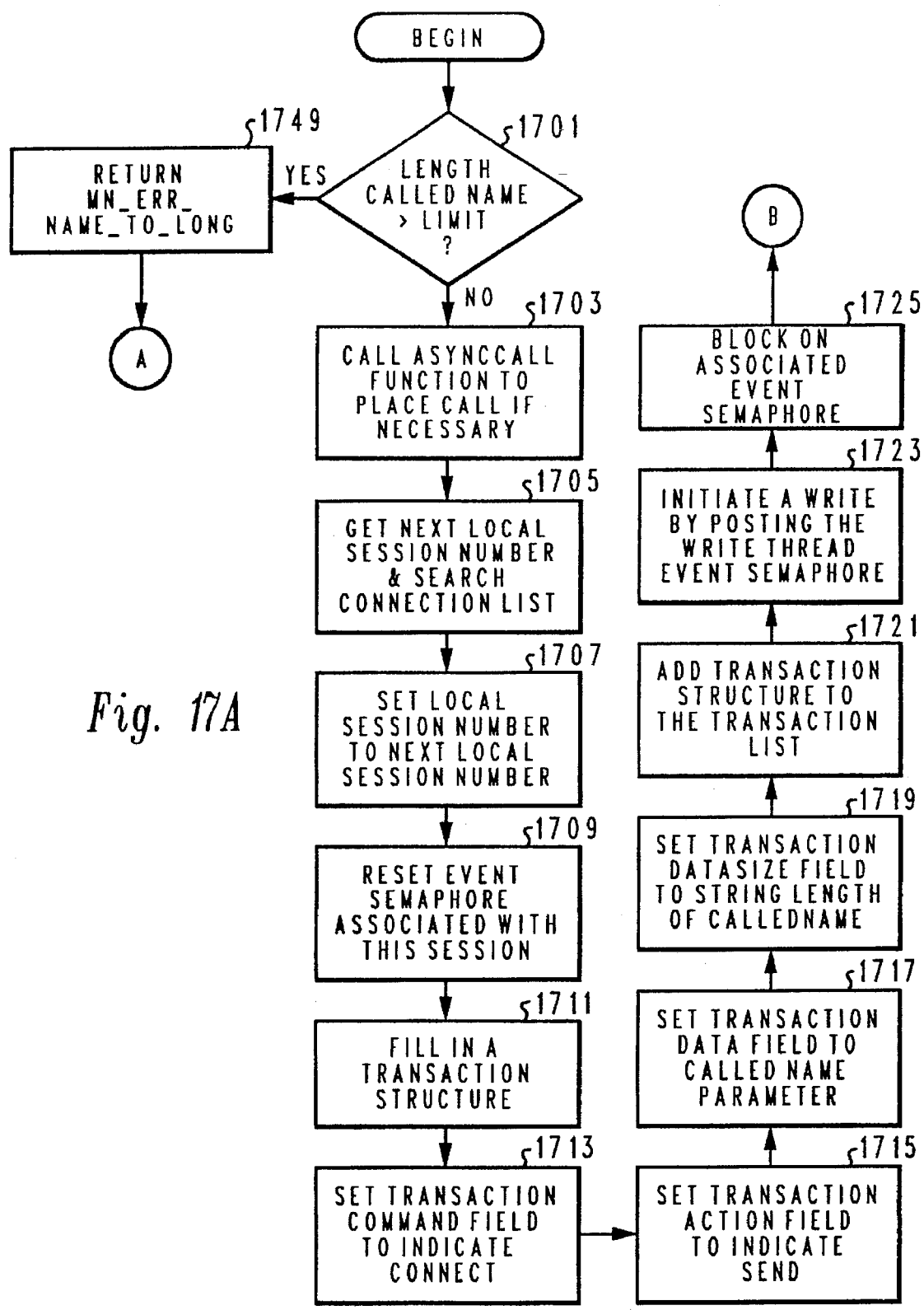
Figure 17B:
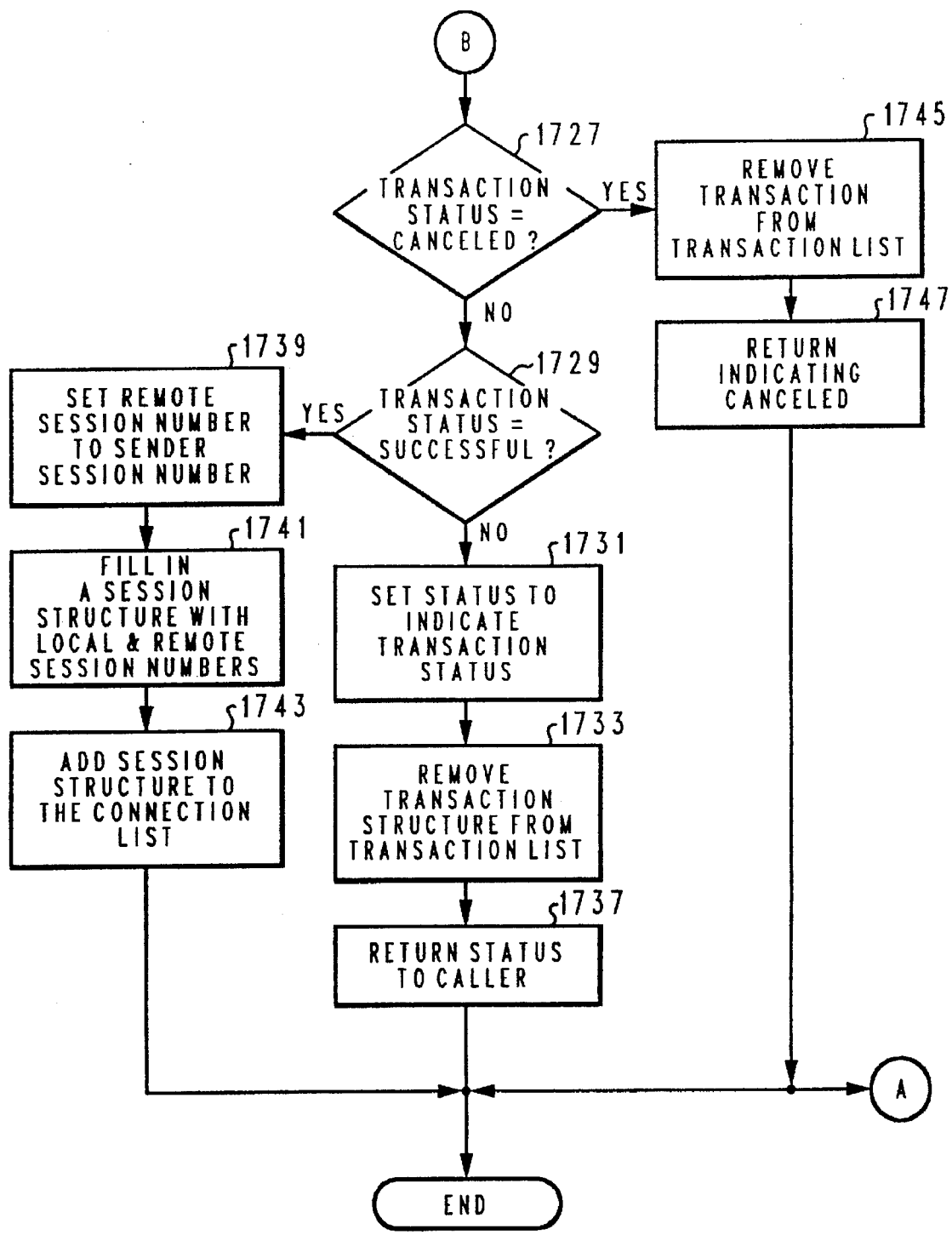

Referring to FIGS. 17A and 17B, a flowchart of the process employed by the call API is illustrated in accordance with a preferred embodiment of the present invention. API calls are also known as procedures. The process begins by determining whether the length of the called name, Called Name, is greater than some preset limit, as illustrated in block 1701. If the length of the called name is not greater than the limit, the process then calls the AsynCall function to place a call if necessary, as illustrated in block 1703. A call is not necessary when a direct connection is employed.

The process then obtains the next local session number and searches the connection list to make sure that the local session number is not in use, as illustrated in block 1705. The process sets the local session number to the next local session number available, as depicted in block 1707. The process resets the event semaphore associated with this session, as illustrated in block 1709.

Next, a transaction structure, MN_TRANSACT, is filled in by the process, as depicted in block 1711. The process sets the transaction Command field to indicate connect, as illustrated in block 1713. Thereafter, the process sets the transaction Action field to indicate send, as depicted in block 1715. The transaction Data field is set by the process to the CalledName parameter, as illustrated in block 1717. Then, the process sets the transaction data size field, DataSize, to the string length of the called name parameter, as depicted in block 1719.

The transaction structure is added to the transaction list as illustrated in block 1721. The process initiates a write by posting the write thread event semaphore, as depicted in block 1723. A block on the associated event semaphore is performed, as illustrated in block 1725. Next, a determination of whether the transaction status in the transaction status field indicates canceled is made, as depicted in block 1727. If the answer to this determination is no, the process then determines whether the transaction status is equal to successful, as illustrated in block 1729. If the transaction status is not equal to successful the process then sets status to indicate the transaction status, as depicted in block 1731. Thereafter, the process removes the transaction from the transaction list, as illustrated in block 1733. The process then terminates after returning the status to the caller, as depicted in block 1737.

Referring back to block 1729, if the transaction status is equal to successful, the process sets the remote session number to the sender session number, as illustrated in block 1739. The process then fills in a session structure with the local and remote session numbers, as illustrated in block 1741. The process then terminates after adding the session structure to the connection list, as depicted in block 1743.

Referring again to block 1727, if the transaction status is equal to canceled, the process removes the transaction from the transaction list as depicted in block 1745. The process then terminates after returning an indication that the transaction has been canceled, as illustrated in block 1747.

Referring again to block 1701, if the length of the called name is greater than the limit, the process then terminates after returning an error indicating that the name is too long, as depicted in block 1749.

Figure 18:
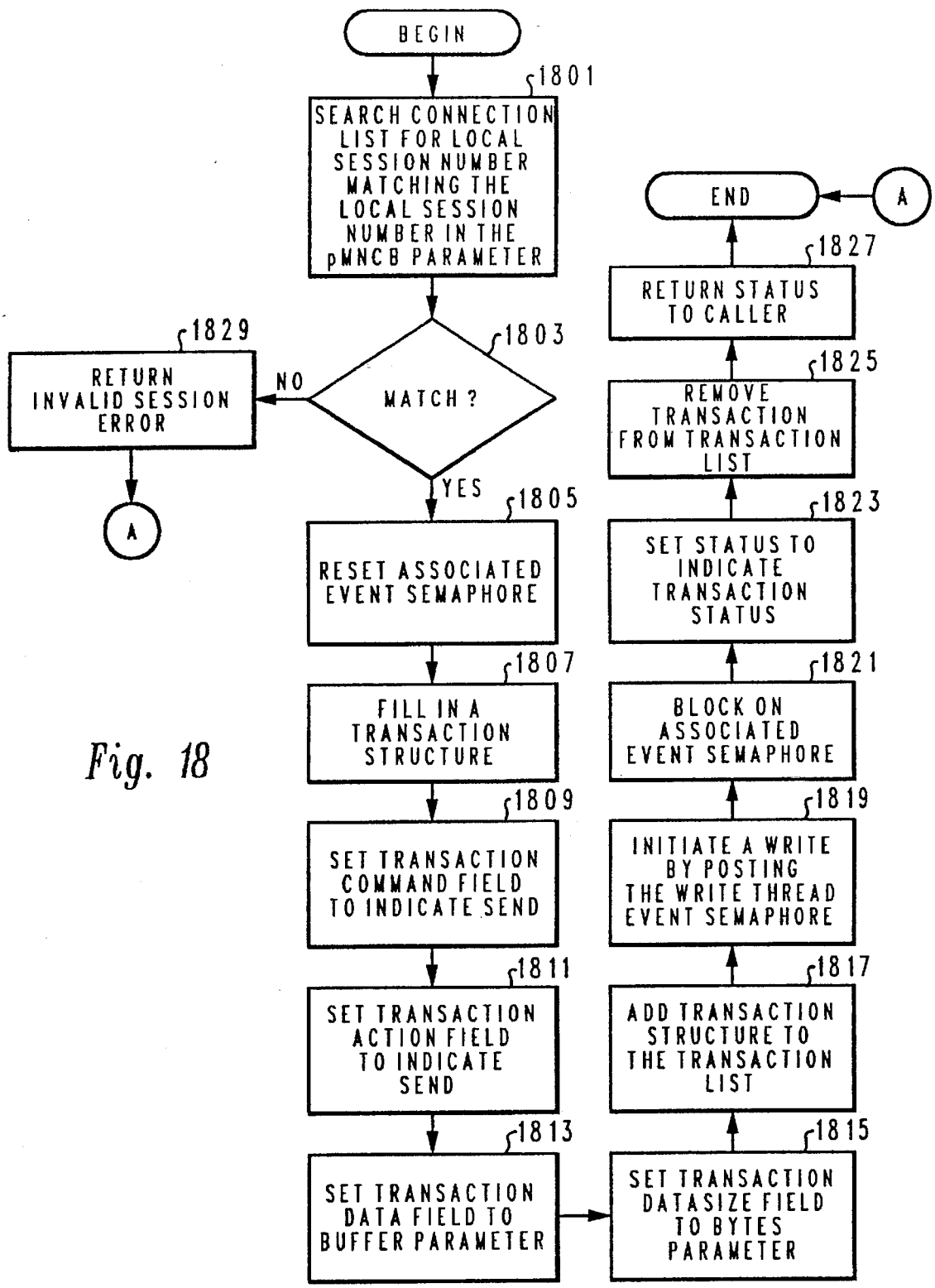

The send function, MNSend (PMNCB pMNCB, PVOID Buffer, ULONG Bytes), sends a block of data to the connection specified by the PMNCB parameter. With reference to FIG. 18, a flowchart of the process employed by the send function is illustrated in accordance with a preferred embodiment of the present invention. The process begins by searching the connection list for a local session number matching the local session number in the PMNCB parameter, as illustrated in block 1801. The process then determines whether a match is present, as depicted in block 1803. If a match is present, the process resets the event semaphore associated with this transaction, as illustrated in block 1805.

Then, the process fills in a transaction structure, MN_TRANSACT, as depicted in block 1807. Thereafter, the process sets the transaction Command field to indicate send, as illustrated in block 1809. The process then sets the transaction Action field to indicate send, as indicated in block 1811. Next, the transaction Data field is set to the buffer parameter, as illustrated in block 1813. The transaction data size field, DataSize, is then set to the bytes parameter, as depicted in block 1815. The transaction structure is added to the transaction list, as illustrated in block 1817. Next, the process initiates a write by posting the write thread semaphore, as depicted in block 1819. The process then blocks on the associated event semaphore, as illustrated in block 1821. The status field is set to indicate the transaction status, as depicted in block 1823. Then, the transaction is removed from the transaction list, as illustrated in block 1825. The process then ends after returning the status to the caller, as depicted in block 1827.

Referring again to block 1803, if a match is not found, the process then ends after returning an invalid session error, as depicted in block 1829.

Figure 19A:
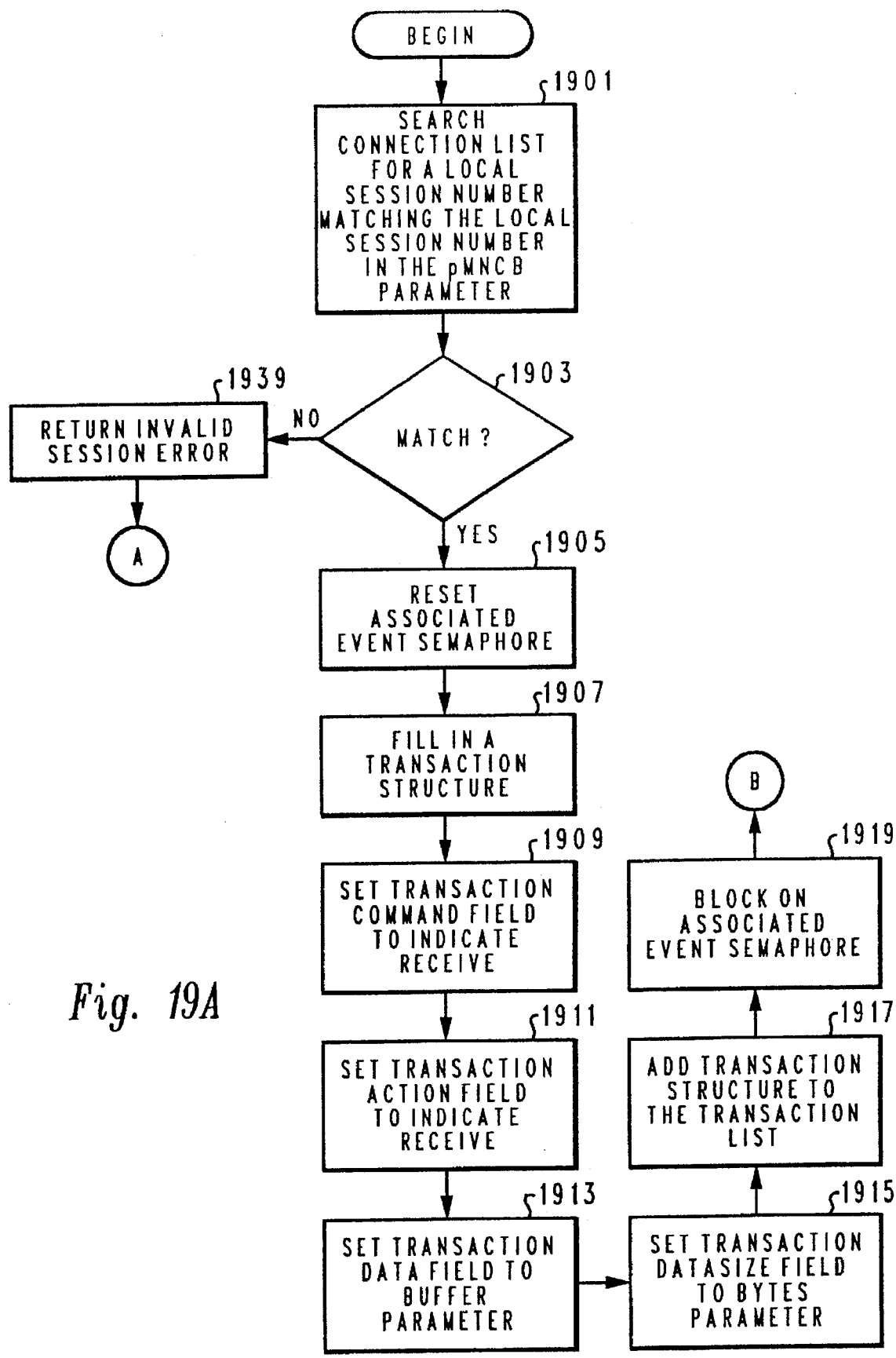
Figure 19B:
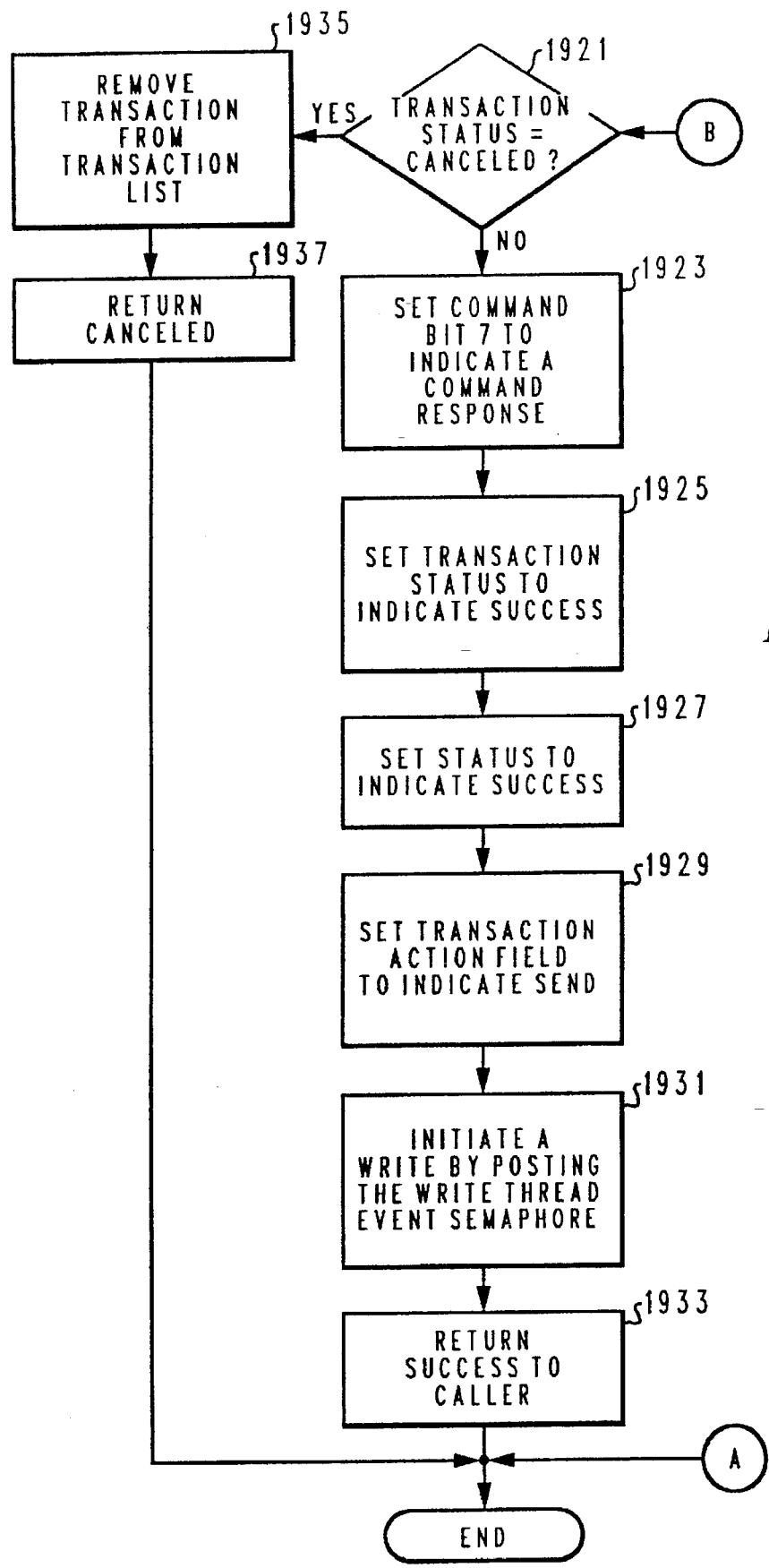
Figure 20A:
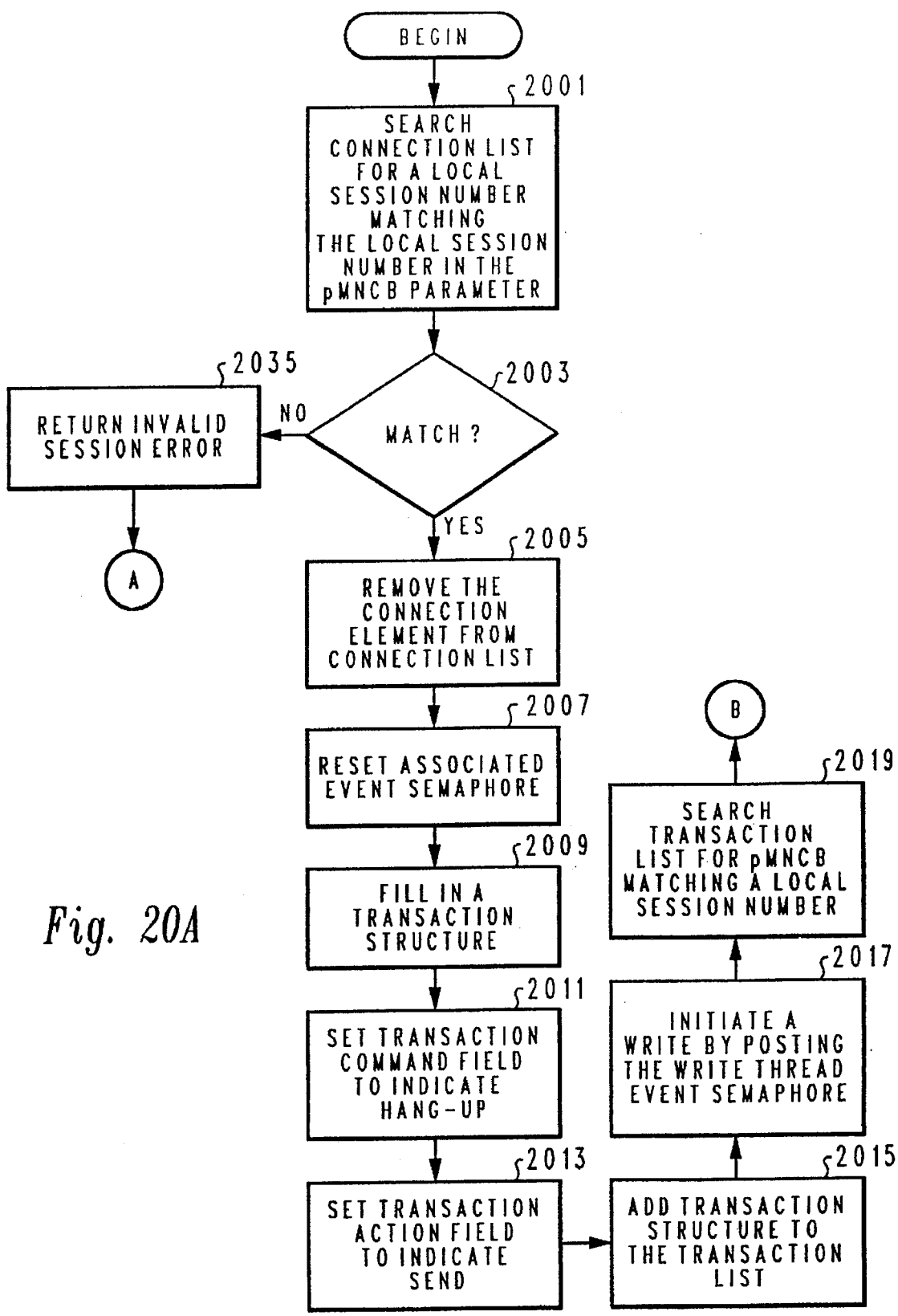
Figure 20B:
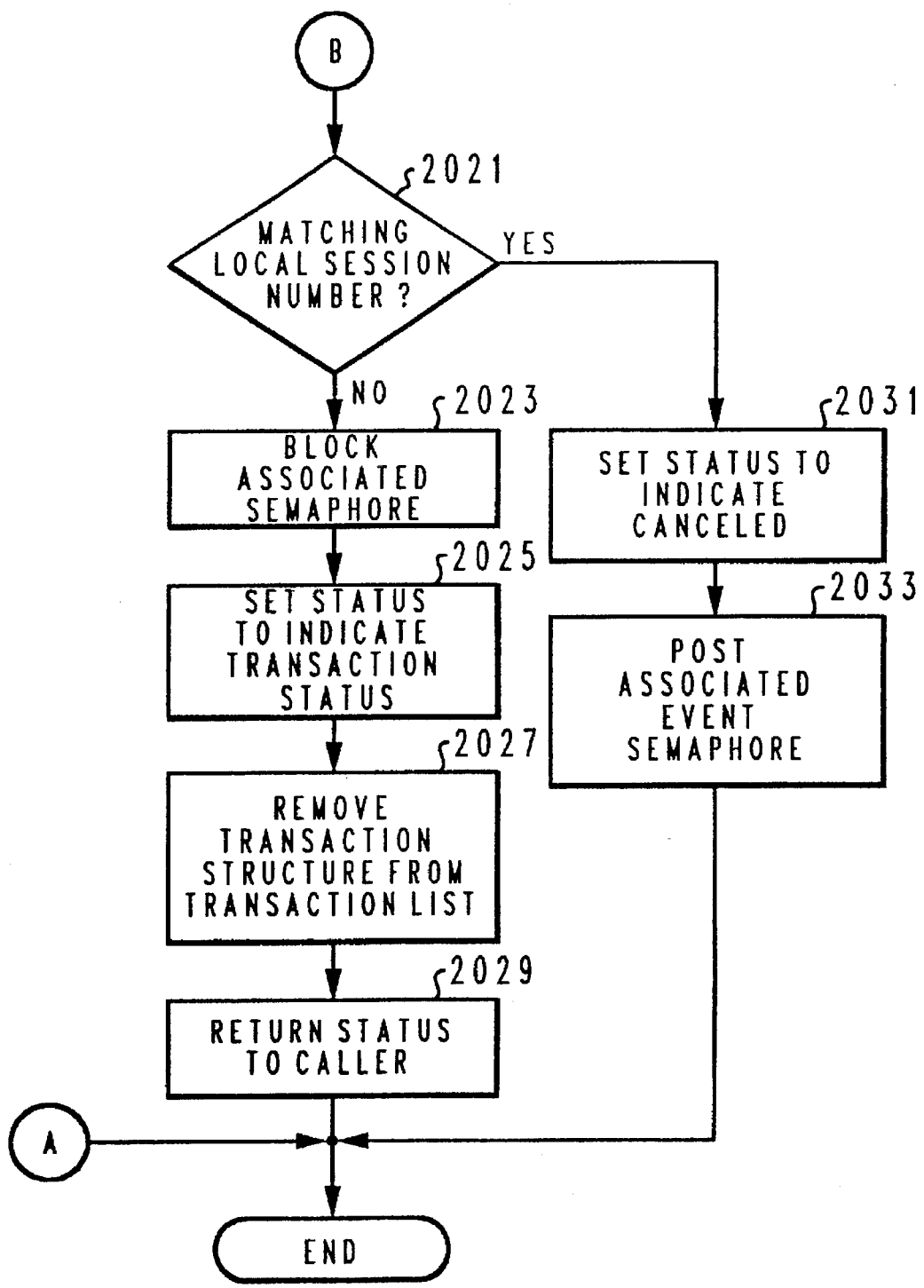

The receive function, MNReceive(PMNCB pMNCB, PVOID Buffer,ULONG Bytes), will receive a block of data from the connection specified by the pMNCB parameter. Referring now to FIGS. 19A and 19B, a flowchart of a process employed by the receive function is illustrated in accordance with a preferred embodiment of the present invention.

The process begins by searching the connection list for a local session number matching the local session number found in the pMNCM parameter, as illustrated in block 1901. A determination of whether of a match is present is made, as depicted in block 1903. If a match is present, the process then resets the event semaphore associated with this session, as illustrated in block 1905. The process then fills in a transaction structure, MN_TRANSACT, as depicted in block 1907. The transaction command field is set to indicate receive, as illustrated in block 1909.

Next, the process sets the transaction Action field to indicate receive, as depicted in block 1911. The transaction Data field is set to the buffer parameter, as illustrated in block 1913. Then, the process sets the transaction DataSize field to the bytes parameter, as depicted in block 1915. Thereafter, the transaction structure is added to the transaction list, as illustrated in block 1917. The process then blocks on the associated event semaphore, as depicted in block 1919. The process then determines whether the transaction status in the transaction status field is equal to canceled, as illustrated in block 1921.

If the transaction status does not equal canceled, the process then indicates a command response, as depicted in block 1923. The process then sets the transaction Status field to indicate success, as illustrated in block 1925. The process sets the transaction status field to indicate success, as depicted in block 1927. Then, the transaction Action field is set to indicate send, as illustrated in block 1939. The process initiates a write by posting the write thread event semaphore, as depicted in block 1931. The process then ends after returning an indication of success to the caller, as illustrated in block 1933.

Referring again to block 1921, if the transaction status is equal to canceled, the process then removes the transaction from the transaction list, as depicted in block 1935. The process then terminates after returning an indication that the transaction has been canceled, as illustrated in block 1937.

Referring back to block 1903, if a match is absent, the process then terminates after returning an invalid session error to the caller, as depicted in block 1939.

The hang-up function, MNHangup (PMNCB pMNCB), will hang-up an established session. Referring now to FIGS. 21A and 21B, a flowchart of a process employing the hang-up function is illustrated in accordance with a preferred embodiment of the present invention. The hang-up function begins by searching the connection list for a local session number matching the local session number in the pMNCB parameter, as illustrated in block 2001. A determination of whether a match is present is made, as depicted in block 2003. The presence of a match results in the removal of the connection element from the connection list, as illustrated in block 2005. The associated event semaphore is reset, as depicted in block 2007.

Thereafter, the process fills in a transaction structure, as illustrated in block 2009. The transaction Command field is set to indicated hang-up, as depicted in block 2011. Then, the transaction Action field is set to indicate send, as illustrated in block 2013. Next, the process adds the transaction structure to the transaction list as depicted in block 2015. A write is initiated by the process by posting the write thread event semaphore as illustrated in block 2017. Then, the process searches the transaction list for a pMNCB with a matching local session number, as depicted in block 2019.

A determination is made as to whether a matching local session number is present, as depicted in block 2021. The absence of a matching local session number results in the process blocking the associated semaphore as illustrated in block 2023. Then, the process then sets the transaction Status field to indicate the transaction status, as depicted in 2025. The transaction is removed from the transaction list, as illustrated in block 2027. The process then ends after returning the status to the caller as depicted in block 2029.

Referring again to block 2021, if a matching local session number is present, the process then sets the status to indicate canceled, as illustrated in block 2031. The process then terminates after posting the associated event semaphore, as depicted in 2033.

Referring back to block 2003 if a match is not found during the search of the connection list for a local session number matching the local session number in the pMNCB parameter, then the process terminates after returning an invalid session error to the caller, as illustrated in block 2035.

Figure 21:
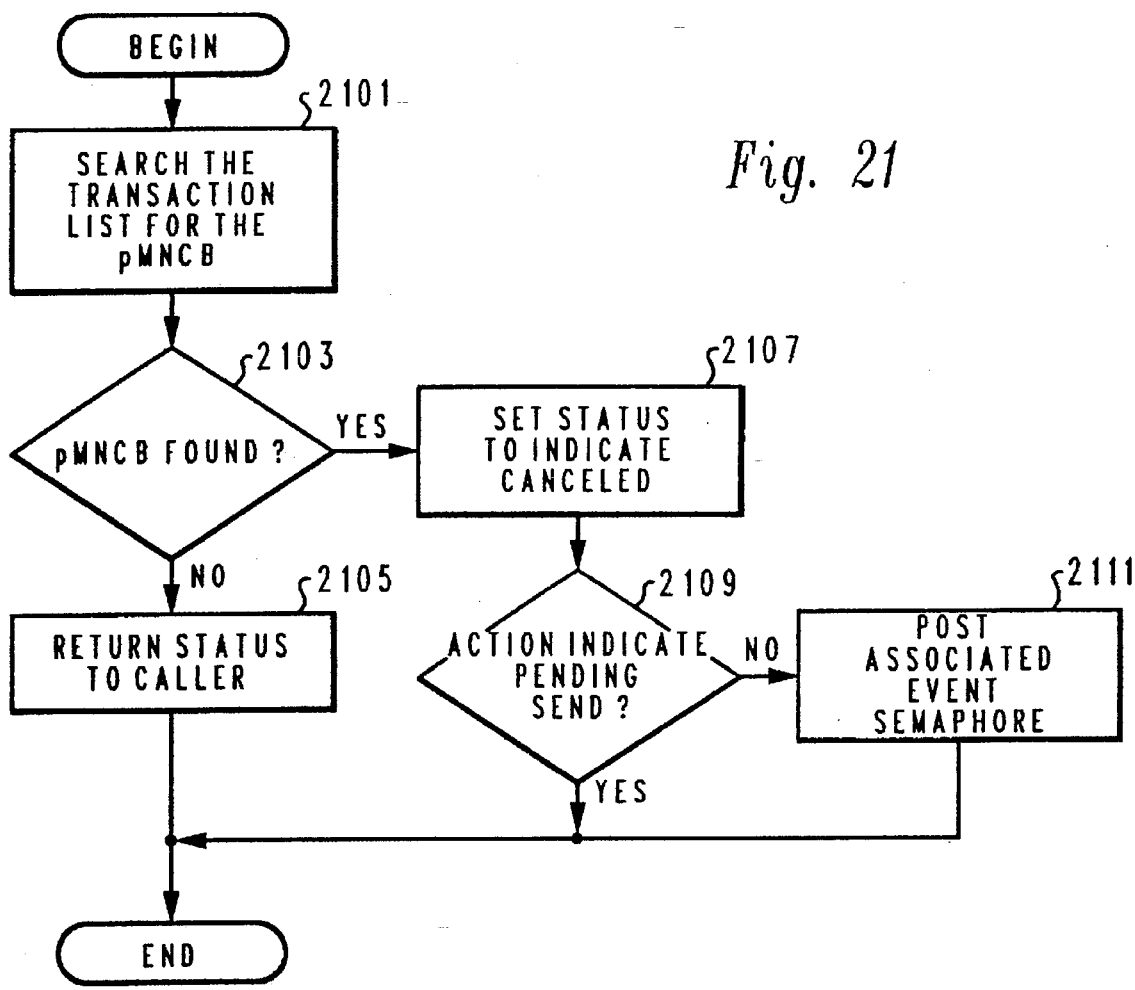

The cancel command, MNCancel (PMNCB pMNCB) will attempt to locate the command and wake-up the command's owner with a command canceled status. Referring now to FIG. 21, a flowchart of a process employing the canceled command is illustrated in accordance with a preferred embodiment of the present invention. The process begins by searching the transaction list for the pMNCB, as illustrated in block 2101. A determination of whether pMNCB is present is made, as depicted in block 2103. The absence of pMNCB, results in returning the status to the caller, as illustrated in block 2105.

Referring again to block 2103, if the answer to this decision block is yes, the process then sets the status to indicate canceled, as depicted in block 2107. Next, a determination of whether the action indicates a pending send is made, as illustrated in block 2105. If the answer is yes, the process then terminates. If the answer to this determination is no, the process terminates after posting the associated event semaphore, as depicted in block 2111.

Data is actually read and written using a read thread and a write thread in accordance with a preferred embodiment of the present invention. Implementation of a read and write thread may be found in code in the Appendix. The code is written in C language.

The processes depicted in the Figures may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method for providing communications between applications, wherein a calling application is located on a first data processing system and a plurality of applications are located on a second data processing system, the method comprising:

receiving a request from the calling application to communicate with each of the plurality of applications, which are executing concurrently on the second data processing system;

establishing a connection over a communications line between the first and second data processing systems;

establishing a session between the calling application and each application within the plurality of applications, wherein multiple sessions are concurrently established;

providing communication between the calling application and each of the plurality of applications utilizing the communications line without requiring termination of a session;

terminating said connection between said first and said second data processing systems: and maintaining each of said established sessions, wherein said termination of said connection does not terminate any of said established sessions.

2. The method of claim 1, wherein the step of establishing a connection between the first and second data processing systems comprises establishing a connection between the first and second data processing systems, wherein the communications line is a serial cable.

3. The method of claim 1, wherein the step of establishing a connection between the first and second data processing systems comprises establishing a connection between the first and second data processing systems, wherein the communications line is a switched telecommunications network.

4. The method of claim 1 further comprising terminating the connection without terminating a session in response to a command to terminate the connection.

5. The method of claim 1 further comprising terminating the connection in response to an absence of communication over the communications line between the first and second data processing system.

6. The method of claim 5 further comprising reestablishing the connection in response to the calling application attempting to send data to one of the plurality of applications on the second data processing system.

7. An apparatus for providing communications between two data processing systems comprising:

a first data processing system;

a second data processing system;

a communications line connecting the first and second data processing systems;

a first interface located on the first data processing system; and a second interface located on the second data processing system, wherein the first interface Includes means for establishing a connection between the first and second interfaces, means for establishing a session for each application on the first data processing system requiring communication with an application on the second data processing system, and wherein the first and second interfaces Includes means for controlling communication between the applications having an established session, means for terminating said connection between said first and second interfaces, and means for maintaining said session for each application.

8. The apparatus of claim 7, wherein the communications line is a serial cable.

9. The apparatus of claim 7, wherein the communications line is a switched network.

10. The apparatus of claim 9, wherein the communications line is a switched telecommunications network.

11. The apparatus of claim 7, wherein said first and second interfaces includes a time out means that terminates the connection if communication over the communications line is absent for a predetermined amount of time and wherein the established sessions are not terminated in response to a termination of the connection.

12. The apparatus of claim 11, wherein said first and second interfaces includes means for reestablishing the connection in response to an application on the first data processing system attempting to communicate with an application on the second data processing system.

13. The apparatus of claim 11 wherein the communications line is a serial cable.

14. The apparatus of claim 12, wherein the communications line is a switched network.

15. The apparatus of claim 14, wherein the communications line is a switched telecommunications network.

16. An apparatus for providing communications between applications, wherein a calling application is located on a first data processing system and a plurality of applications are located on a second data processing system, the method comprising;

reception means for receiving a request from the calling application to communicate with at least one of the plurality of applications, which are executing concurrently on the second data processing system;

first establishing means for establishing a connection over a communications line between the first and second data processing systems;

second establishing means for establishing a session between the calling application and each application within the plurality of applications, wherein multiple sessions are concurrently established;

communications means providing communication between the calling application and each of the plurality of applications utilizing the communications line without requiring termination of a session, wherein communications is efficiently provided between applications;

termination means for terminating said connection between said first and said second data processing systems; and maintenance means for maintaining each of said established sessions, wherein termination of said connection does not terminate any of said established sessions.

17. The apparatus of claim 16, wherein the communications line is a serial cable.

18. The apparatus of claim 16, wherein the communications line is a switched telecommunications network.

19. The apparatus of claim 16 further comprising termination means for terminating the connection without terminating a session in response to a command to terminate the connection.

20. The apparatus of claim 16 further comprising termination means for terminating the connection in response to an absence of communication over the communications line between the first and second data processing system.

21. The apparatus of claim 20 further wherein first establishing means reestablishes the connection in response to the calling application attempting to send data to one of the plurality of applications on the second data processing system.

22. A storage device readable by a data processing system and encoding data processing system executable instructions for providing communications between applications, wherein a calling application is located on a first data processing system and a plurality of applications are located on a second data processing system, the program storage device comprising:

receiving means for receiving a request from the calling application to communicate with the plurality of applications, which are executing concurrently on the second data processing system;

first establishing means for establishing a connection over a communications line between the first and second data processing systems;

second establishing means for establishing a session between the calling application and each application within the plurality of applications, wherein multiple sessions are concurrently established;

communications means providing communication between the calling application and each of the plurality of applications utilizing the communications line without requiring termination of a session;

termination means for terminating said connection between said first and said second data processing systems; and maintenance means for maintaining each of said established sessions, wherein said termination of said connection does not terminate any of said established sessions.

23. The storage device of claim 22, wherein said program storage device is a hard disk drive.

24. The storage device of claim 22, wherein said program storage device is a ROM for use with a data processing system.

25. The storage device of claim 22, wherein said program storage device is a floppy diskette.

26. A method for providing communications between a first data processing system and a second data processing system using a switched telecommunications network, said method comprising:

receiving a request from a first application on the first data processing system to communicate with a second application on the second data processing system;

establishing a connection between the first and second data processing system through the switched telecommunications network using a first modem connected to the first data processing system and a second modem connected to a second data processing system;

establishing a first session between the first and second application over the communications line;

establishing a second session between a third application on the first data processing system and a fourth application on the second data processing system, wherein multiple simultaneous sessions are supported over the switched telecommunications network;

terminating said connection between said first and said second data processing system; and maintaining the first and second sessions in response to said termination of the connection between the first and second data processing systems.

27. The method of claim 26 further comprising reestablishing the connection in response to the first application on the first data processing system attempting to communicate with an application on the second data processing system.

28. The method of claim 26 further comprising terminating the connection in response to a command to terminate said first session.

29. The method of claim 26 further comprising terminating the connection in response to an absence of communication between applications In the first data processing system and in the second data processing system for a preselected amount of time.

* * * * *